United States Patent
Park et al.

(10) Patent No.: US 8,139,582 B2
(45) Date of Patent: Mar. 20, 2012

(54) METHOD AND APPARATUS FOR MAKING TRANSPORT FRAME AND METHOD AND APPARATUS FOR PROCESSING TRANSPORT FRAME

(75) Inventors: Sung-il Park, Suwon-si (KR); Ga-hyun Ryu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 187 days.

(21) Appl. No.: 12/122,975

(22) Filed: May 19, 2008

(65) Prior Publication Data

US 2008/0285564 A1 Nov. 20, 2008

Related U.S. Application Data

(60) Provisional application No. 60/938,478, filed on May 17, 2007.

(30) Foreign Application Priority Data

Jul. 20, 2007 (KR) .................. 10-2007-0073121

(51) Int. Cl.
*H04L 12/28* (2006.01)
*H04L 12/56* (2006.01)
*H04J 3/24* (2006.01)

(52) U.S. Cl. .................. 370/392; 370/395.1; 370/474

(58) Field of Classification Search ............ None
See application file for complete search history.

(56) References Cited

U.S. PATENT DOCUMENTS

| | | | |
|---|---|---|---|
| 6,167,084 A | 12/2000 | Wang et al. | |
| 7,499,469 B2* | 3/2009 | Fu et al. | 370/466 |
| 2003/0219041 A1* | 11/2003 | Oh | 370/535 |
| 2004/0136352 A1 | 7/2004 | Fu et al. | |
| 2004/0197080 A1* | 10/2004 | Bak | 386/52 |
| 2005/0135291 A1* | 6/2005 | Ketchum et al. | 370/319 |
| 2005/0206783 A1* | 9/2005 | Kato | 348/384.1 |
| 2007/0133607 A1* | 6/2007 | Park | 370/484 |

FOREIGN PATENT DOCUMENTS

KR 1020060065464 A 6/2006

OTHER PUBLICATIONS

Korean Office Action issued Jul. 12, 2011 in Korean Application No. 10-2007-0073121.

* cited by examiner

*Primary Examiner* — Chirag Shah
*Assistant Examiner* — Ashley Shivers
(74) *Attorney, Agent, or Firm* — Sughrue Mion, PLLC (57) ABSTRACT

Provided are a method and apparatus for creating a transport frame in order to identify the starts of packets, and a method and apparatus for processing the transport frame. In the method of creating the transport frame, at least one packet to be transported by being loaded in the transport frame is received. Then, information about the start location of a first packet, that is, a packet whose head and tail are both in the transport frame and which comes first within the transport frame, among the received at least one packet is created. Next, the transport frame, including the at least one packet and the start location information about the first packet, is created.

24 Claims, 7 Drawing Sheets

METHOD AND APPARATUS FOR MAKING TRANSPORT FRAME AND METHOD AND APPARATUS FOR PROCESSING TRANSPORT FRAME

CROSS-REFERENCE TO RELATED PATENT APPLICATION

This application claims priority from Korean Patent Application No. 10-2007-0073121, filed on Jul. 20, 2007, in the Korean Intellectual Property Office, and the benefit of U.S. Provisional Patent Application No. 60/938,478, filed on May 17, 2007, in the U.S. Patent and Trademark Office, the disclosures of which are incorporated herein in their entirety by reference.

BACKGROUND OF THE INVENTION

1. Field of the Invention

The present invention relates to a method and apparatus for making a transport frame and a method and apparatus for processing a transport frame, and more particularly, to a method and apparatus for making and processing a transport frame used to identify synchronization of a packet.

2. Description of the Related Art

With recent developments in information communications technology and network technology, fast transmission of large-capacity data is attracting much attention. In particular, as digital audio devices having high sound quality, such as CDs, DVDs, etc., become widely available, user demand for digital broadcasting of high sound quality is increasing. Therefore, a transport system that effectively transports large-capacity data is needed.

In general transport systems, elementary streams (ESs) are divided into packets and transported, and the packets are loaded in a frame. The frame including the packets is transported to a receiver, which, in turn, separates the packets from the frame in order to extract the ESs. Thus, a method of identifying packets in order to extract ESs from a received frame is needed.

In particular, as for transport frames having consistent sizes, an integral number of packets may not be loaded in each of the transport frames. In other words, a packet may be transported with a front part of the packet being loaded in a first frame and the other part thereof being loaded in a second frame. This form of transportation does not cause any problems when the first and second frames are both received. However, when only the second frame is received, the packet partially loaded in the second frame cannot be used. Thus, the start location of the next packet needs to be searched for in the second frame. However, it is difficult to find the start location of the next packet because the start location of the second frame is not the same as that of a packet.

Figure 1A:
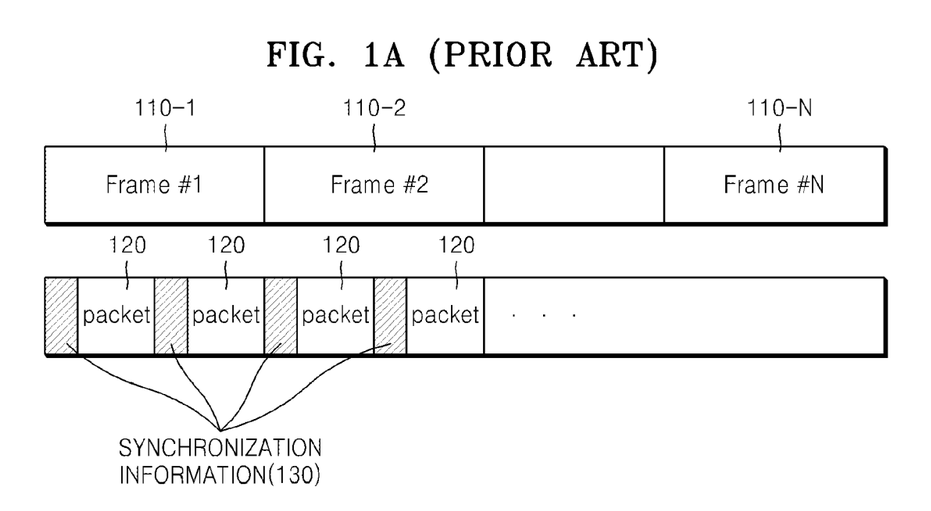
FIGS. 1A, 1B, and 1C illustrate embodiments of a conventional method of identifying packets included in a frame.

FIG. 1A illustrates an embodiment of a conventional method of identifying packets included in a frame.

Referring to FIG. 1A, packets 120 are transmitted by being loaded in N transport frames 110-1 through 110-N. Each of the packets 120 is accompanied by synchronization information 130. The packets 120 accompanied by the synchronization information 130 are consecutively loaded in the transport frames 110-1 through 110-N so as to be transported.

The receiver receives the transport frames 110-1 through 110-N, separating the packets 120 therefrom, and extracts the ESs from the packets 120. The packets 120 are divided from each other by using the synchronization information 130.

As described above, according to the conventional method of identifying the packets 120 by adding the synchronization information 130, the packets 120 are identified by reading the synchronization information 130 during a depacketizing process. However, because the validity of the read-out synchronization information 130 is not guaranteed, a special algorithm or process for verifying whether the synchronization information 130 is valid is needed. Additionally, the addition of the synchronization information 130 reduces data efficiency.

Figure 1B:
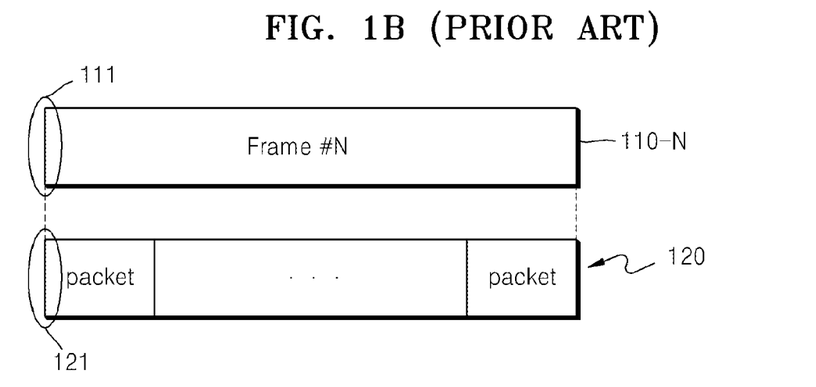

FIG. 1B illustrates another embodiment of a conventional method of identifying packets included in a frame.

Referring to FIG. 1B, an integral number of packets 120 are transmitted by being loaded in the transport frame 110-N. The packets 120 are consecutively loaded in the transport frame 110-N, and the number of packets to be loaded in the transport frame 110-N is always an integer. By designing the transport frame 110-N as described above so that only an integral number of packets 120 are loaded in the transport frame 110-N, the start location 111 of the transport frame 110-N is equal to the start location 121 of a packet, and thus the packets 120 can be identified.

However, the conventional method illustrated in FIG. 1B needs a special packet structure corresponding to the type of transport frame. Thus, an existing packet structure may not be used. Additionally, even when a new packet configuration needs to be designed, it is affected by the size of a frame, so that it is actually impossible to design an independent packet configuration.

Figure 1C:
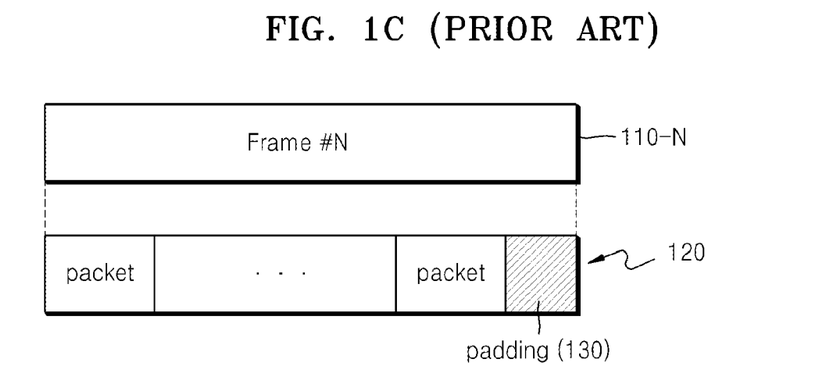

FIG. 1C illustrates another embodiment of a conventional method of identifying packets included in a frame.

Referring to FIG. 1C, the packets 120 are transported by being loaded in the transport frame 110-N. The packets 120 are consecutively loaded in the transport frame 110-N. When the size of the transport frame 110-N is not an integral multiple of the size of each packet 120, an extra space 130 is generated. The extra space 130 is filled with padding data.

By filling the extra space 130 of the transport frame 110-N with the padding data as described above, the start location 111 of the transport frame 110-N can be aligned with the start location 121 of a packet. Consequently, the packets 120 can be identified.

However, the addition of the padding data to the extra space 130 of each frame in the conventional method illustrated in FIG. 1C denotes a waste of a channel for transporting data corresponding to the extra space 130 filled with the padding data.

As described above, in order to identify the start locations of packets included in each of transport frames having consistent sizes, additional data such as synchronization information or padding data is needed, or the size of each packet should be controlled so that an integral number of packets are loaded in a transport frame. Therefore, the data transmission efficiency is degraded, or a configuration of packets cannot be designed independently.

SUMMARY OF THE INVENTION

The present invention provides a method and apparatus for making a transport frame so that the efficiency of the transport frame is increased and that a flexible packet configuration can be designed, and a method and apparatus for processing the transport frame.

According to an aspect of the present invention, there is provided a method of creating a transport frame, the method comprising the operations of: receiving at least one packet to be transported by being loaded in the transport frame; creating start location information about the first packet, that is, a packet whose head and tail are both in the transport frame and which comes first within the transport frame, among the received at least one packet; and creating the transport frame, the transport frame including the at least one packet and the start location information about the first packet.

The start location information about the first packet may be an offset value that denotes a distance from a start location of a packet transport channel, which is a section included in the transport frame and used to transport packets, to the first packet.

The start location information about the first packet may be a frame ID that is allocated to the transport frame and used to search for the start location of the first packet from a predetermined table that stores start locations for the first packet included in the transport frame.

The start location information about the first packet may comprise a frame ID allocated to the transport frame, a length of the packet transport channel, and a length of each packet, which are used in a predetermined equation for calculating the start location of the first packet according to the length of the packet transport channel and the length of each packet.

The operation of creating the start location information about the first packet may include the sub-operations of: calculating a cycle during which a start location of a first packet within each transport frame recurs, by using a least common multiple of the length of the packet transport channel of the transport frame and the length of each packet; and sequentially allocating one of the frame IDs to the transport frame, the frame IDs being repeated at intervals of the calculated cycle.

The predetermined equation may be:

$$RAP(i) = \text{packet length} - \text{MOD}(\text{packet transport channel length} \times (i-1), \text{packet length})$$

where i denotes the frame ID of the transport frame, RAP(i) denotes the start location of the first packet loaded in a transport frame with an ID of 'i', and MOD( ) denotes a modulo function for calculating a remainder of a division of the packet transport channel length×(i−1) by the packet length.

According to another aspect of the present invention, there is provided a method of processing a transport frame, the method comprising the operations of: receiving a transport frame, the transport frame including at least one packet and start location information about a first packet, which is a packet whose head and tail are both in the transport frame and which comes first within the transport frame; extracting a start location of the first packet from the start location information included in the received transport frame; and processing the at least one packet included in the transport frame, based on the extracted start location.

The start location information about the first packet may be an offset value that denotes a distance from a start location of a packet transport channel, which is a section included in the transport frame and used to transport packets, to the first packet.

The start location information about the first packet may be a frame ID allocated to the received transport frame. The operation of extracting the start location of the first packet may comprise the sub-operation of searching a start location of the first packet corresponding to the frame ID from a predetermined table that stores start locations for the first packet included in the transport frame.

The start location information about the first packet may comprise a frame ID allocated to the received transport frame, a length of a packet transport channel, which is a section included in the received transport frame and used to transport packets, and a length of each packet included in the received transport frame. The operation of extracting the start location of the first packet may comprise the sub-operation of computing the start location of the first packet according to a predetermined equation for calculating the start location of the first packet according to the length of the packet transport channel and the length of each packet.

The predetermined equation may be:

$$RAP(i) = \text{packet length} - \text{MOD}(\text{packet transport channel length} \times (i-1), \text{packet length})$$

where i denotes the frame ID of the transport frame, RAP(i) denotes the start location of the first packet loaded in a transport frame with an ID of 'i', and MOD( ) denotes a modulo function for calculating a remainder of a division of the packet transport channel length×(i−1) by the packet length.

According to another aspect of the present invention, there is provided an apparatus for creating a transport frame, the apparatus comprising: a receiving unit receiving at least one packet to be transported by being loaded in the transport frame; a start location information creating unit creating start location information about the first packet, that is, a packet whose head and tail are both in the transport frame and which comes first within the transport frame, among the received at least one packet; and a frame multiplexing unit creating the transport frame, the transport frame including the at least one packet and the start location information about the first packet.

According to another aspect of the present invention, there is provided an apparatus for processing a transport frame, the apparatus comprising: a receiving unit receiving a transport frame, the transport frame including at least one packet and start location information about a first packet, which is a packet whose head and tail are both in the transport frame and which comes first within the transport frame; a start location extraction unit extracting a start location of the first packet from the start location information included in the received transport frame; and a processing unit processing the at least one packet included in the transport frame, based on the extracted start location.

Accordingly, packets are identified without using additional data such as padding data or synchronization information for identifying packets. Consequently, a data transmitting space can be efficiently used.

Additionally, packets are designed without being influenced by the format of a frame such as the length of the frame. Therefore, flexible packet design is possible.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of the present invention will now be described more fully with reference to the accompanying drawings.

Figure 2:
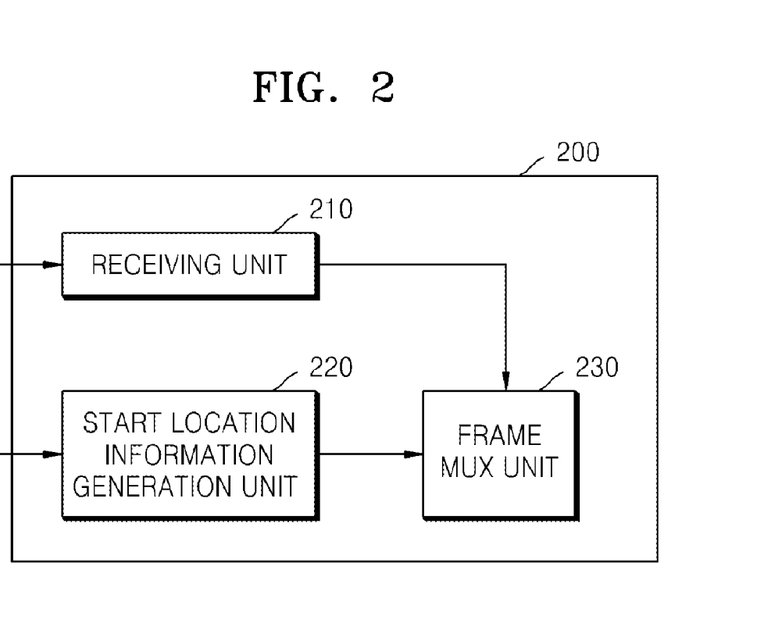
FIG. 2 is a block diagram of a frame creating apparatus according to an exemplary embodiment of the present invention.

FIG. 2 is a block diagram of a frame creating apparatus 200 according to an embodiment of the present invention.

Referring to FIG. 2, the frame creating apparatus 200 includes a receiving unit 210, a start location information generation unit 220, and a frame MUX unit 230.

The receiving unit 210 receives at least one packet that is to be transported by being included in the transmission frame. The receiving unit 210 may further include a special packet MUX unit (not shown). In this case, the receiving unit 210 receives external data that is used to form packets, and generates the packets in the special packet MUX unit.

The start location information generation unit 220 generates start location information about a first packet, which is an initial packet whose head and tail are both included in the transport frame, among the at least one packet that is to be transported by being included in the transmission frame. The first packet denotes an initial packet whose head and tail are both included in a transport frame.

When the start location of the first packet is determined from the transport frame, the start locations of the residual packets can also be determined by using the start location of the first packet and the length of each packet, because when the lengths of packets are consistent, a location a packet length away from the start location of the first packet corresponds to the start location of a new packet.

For example, it is assumed that the start location of the first packet is a unit length of '3' away from the start location of a packet transport channel, which is a section that is included in a transport frame and used in transporting packets, and that each packet that is transmitted by being included in the transport frame has a length of '10'.

At least one packet is consecutively loaded in the transport frame. Accordingly, the start location of a packet next to the first packet is a unit length of '13' away from the start location of the packet transmission channel included in the transport frame. In this way, the respective packets start at locations unit lengths of '23', '33', etc. away from the start location of the packet transmission channel included in the transport frame.

The start location information about the first packet may be implemented in various forms.

First, the start location information about the first packet may be an offset value that denotes a distance from the start location of the packet transport channel of the transport frame to the first packet as described above. As described above, the packet transmission channel denotes a section that is included in a frame and is used to transport packets.

Second, the start location information about the first packet may be a frame ID that is allocated to the transport frame and used to search for the start location of the first packet from a predetermined table that stores start locations for the first packet included in the transport frame.

The predetermined table may be stored in a predetermined storage area of the receiver or may be received from a transmitter.

Generation of the frame ID will be described later with reference to FIG. 3.

A table used to ascertain the start location of the first packet from the frame ID and a method of ascertaining the start location of the first packet from the frame ID by using the table will be described later with reference to FIG. 5.

Third, the start location information about the first packet may be the frame ID of a transport frame, the length of a packet transport channel, which is a section of the transport frame which is used to transmit packets in the transport frame, and the length of each packet. The frame ID, the length of the packet transport channel, and the length of each packet are used in a predetermined equation for calculating the start location of the first packet according to the length of the packet transport channel and the length of each packet.

Equation 1, which will be described later, is an example of the predetermined equation for calculating the start location of the first packet according to the length of the packet transport channel and the length of each packet. A method of obtaining the start location of the first packet using the predetermined equation based on the length of the packet transport channel and the length of each packet will be described later with reference to FIGS. 5 and 6.

The start location information about the first packet is not limited to the aforementioned three examples, but may be implemented in other forms.

The frame MUX unit 230 generates a transport frame that includes the at least one packet received by the receiving unit 210 and the start location information about the at least one packet generated by the start location information generation unit 220. The frame MUX unit 230 may insert the start location information into a frame header or add the start location information to field synchronization information as in an advanced vestigial side band (A-VSB) transport system to be described later with reference to FIG. 7.

Figure 3:
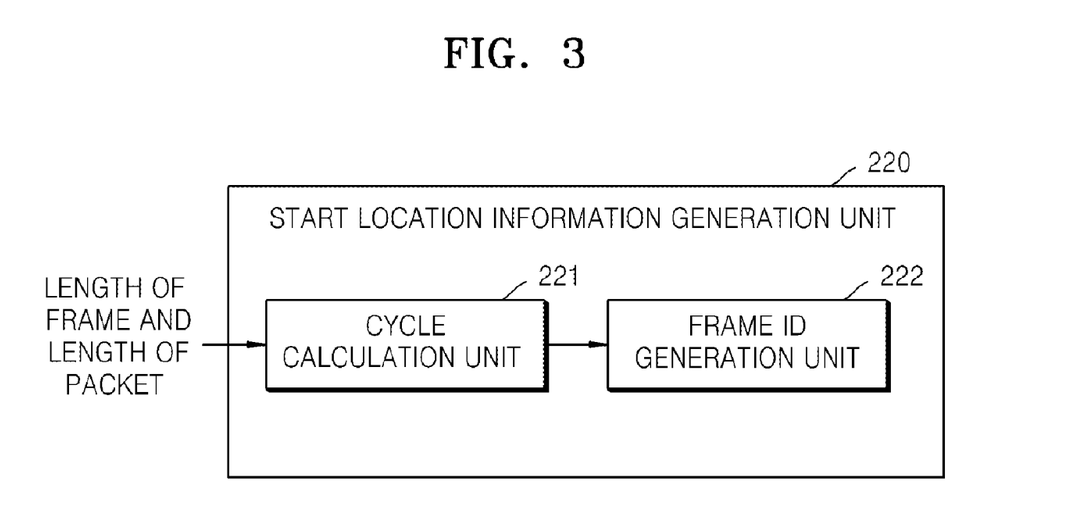
FIG. 3 is a block diagram of an embodiment of a start location information generation unit illustrated in FIG. 2.

FIG. 3 is a block diagram of an embodiment of the start location information generation unit 220. The start location information generation unit 220 illustrated in FIG. 3 generates frame IDs as the start location information about the first packet as described above with reference to FIG. 2.

The start location information generation unit 220 includes a cycle calculation unit 221 and a frame ID generation unit 222.

The cycle calculation unit 221 calculates a cyclical set of frame IDs corresponding to starting locations of a first packet within each transport frame. This set is calculated by using a least common multiple of the length of the packet transport channel of the transport frame and the length of each packet.

For example, when the length of the packet transport channel is 20 and the length of each packet is 3, the least common multiple thereof is 60. Generally, in a frame that is initially transported, the start location of each of the packets loaded in the frame is equal to the start location of the packet transport channel of the frame. Additionally, because the packets are transmitted by being consecutively loaded in the packet transport channel, the start locations of a packet and a packet transport channel re-coincide with each other at a place where a sum of the lengths of packets transmitted reaches an integral multiple of 60.

Accordingly, a location of the first packet in a first transport frame and a location of the first packet in a fourth transport frame are identical on a packet transmission channel. In other words, the cycle during which the start location of a first packet within each transport frame repeats is three transport frames.

The frame ID generation unit 222 sequentially allocates frame IDs to the transport frames, the frame IDs being repeated at intervals of the cycle calculated by the cycle calculation unit 221. If 5 transport frames, namely, first through fifth transport frames, are transmitted and the cycle calculated by the cycle calculation unit 221 is 3 transport frames, the allocated frame IDs are '1', '2', and '3'. In other words, the frame IDs of the first and fourth transport frames are '1', the frame IDs of the second and fifth transport frames are '2', and the frame ID of the third transport frame is '3'.

In the present embodiment, the frame IDs of the transport frames are selected from '1', '2', and '3' in consideration of the efficiency of data. However, different sequential numbers may be allocated as the frame IDs according to the sequence in which the transport frames are transmitted. For example, the frame ID of the first transport frame is '1', and the frame ID of the fifth transport frame is '5'.

Figure 4:
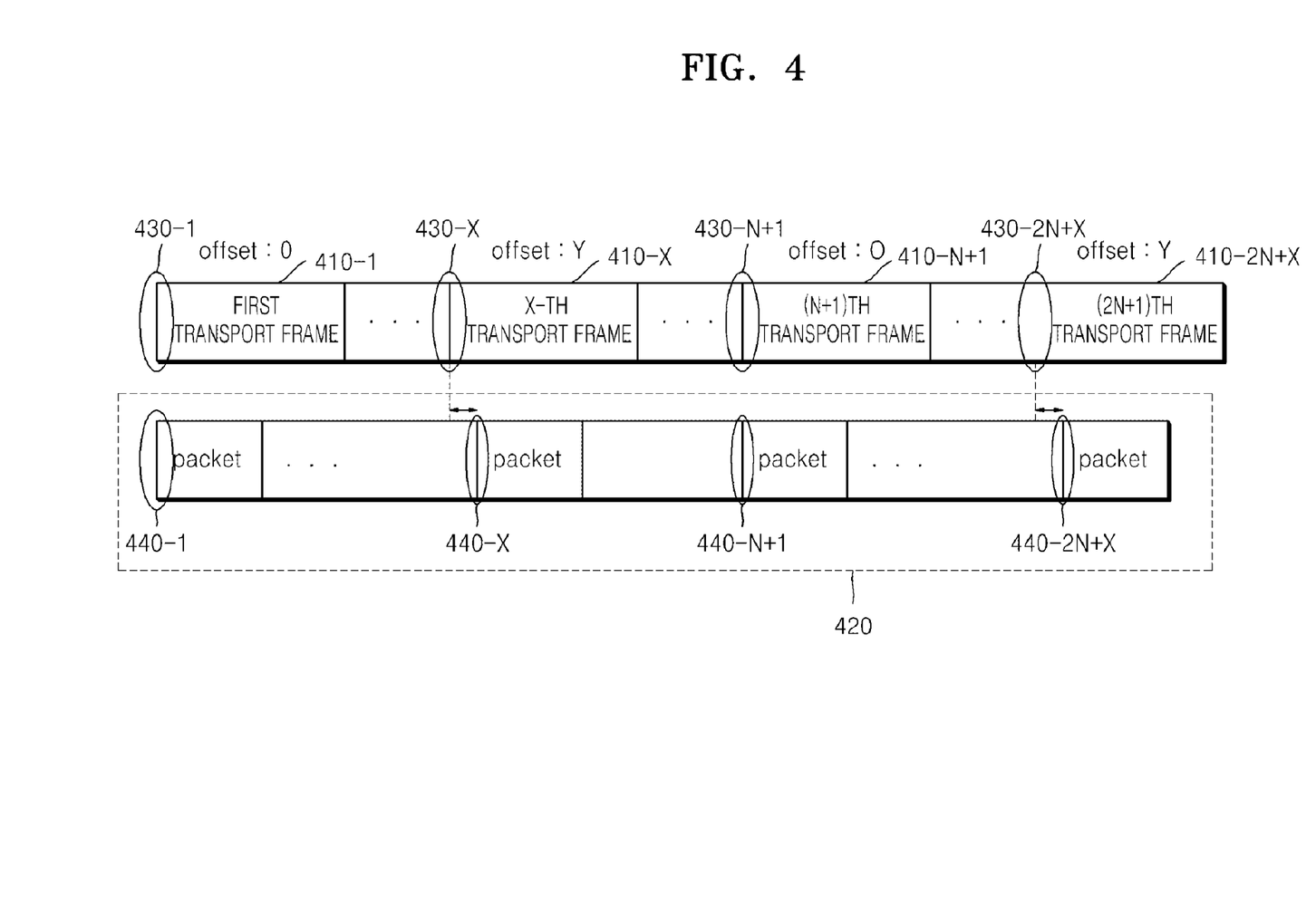
FIG. 4 shows frame ID generation performed by the start location information generation unit illustrated in FIG. 3.

FIG. 4 shows a diagram for illustrating frame ID generation performed by the start location information generation unit 220 illustrated in FIG. 3.

Referring to FIG. 4, packets 420 are transported by being loaded in 2N+X transport frames.

A first transport frame 410-1 has an offset value of 0 because a start location 430-1 of a packet transport channel of the first transport frame 410-1 is identical to a start location 440-1 of a first packet thereof A start location 430-X of a packet transport channel of an X-th transport frame 410-X is not identical to a start location 440-X of a first packet loaded in the X-th transport frame 410-X thereof. The X-th transport frame 410-X has an offset value of Y, which is a difference between the start locations 430-X and 440-X.

As for packets transported by being loaded in transport frames, as described above, the value representing the start location of the first packet in each transport frame repeats every cycle depending on the length of a packet transport channel or the size of a packet. In the present embodiment, it is assumed that the cycle is N frames.

A start location 430-N+1 of a packet transport channel of an (N+1)th transport frame 410-N+1 is identical to a start location 440-N+1 of a first packet loaded in the (N+1) transport frame 410-N+1. Thus, the (N+1)th transport frame 410-N+1 has an offset value of 0.

Similarly, a start location 430-2N+X of a packet transport channel of a (2N+X)th transport frame 410-2N+X is not identical to a start location 440-2N+X of a first packet loaded in the (2N+X)th transport frame 410-2N+X thereof The (2N+X)th transport frame 410-2N+X has an offset value of Y. In other words, every N-th transport frame has an identical offset value. Thus, frame IDs of 1 through N are sequentially allocated to transport frames and the allocated 1 through N frame IDs repeat.

Figure 5:
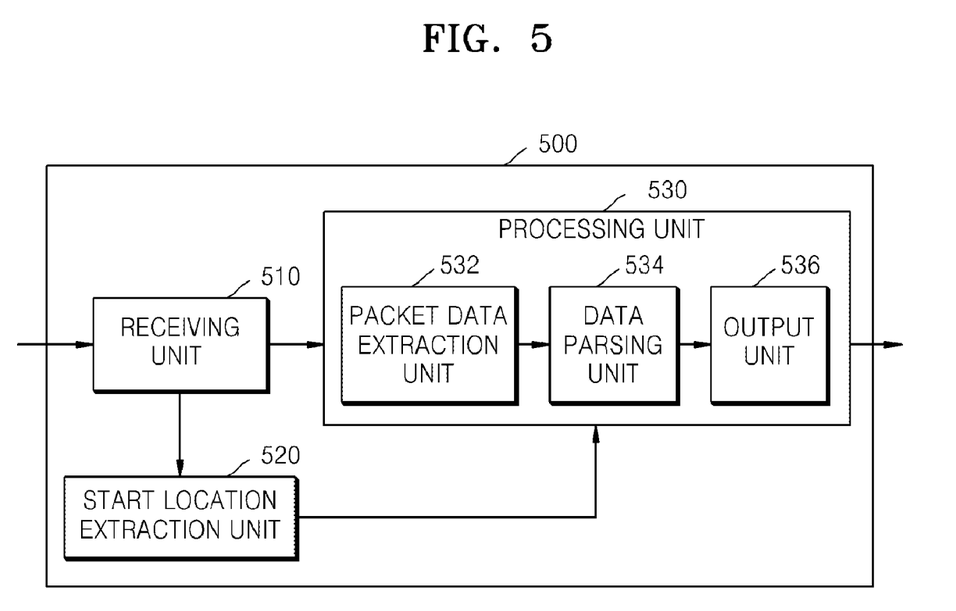
FIG. 5 is a block diagram of a frame processing apparatus according to an exemplary embodiment of the present invention.

FIG. 5 is a block diagram of a frame processing apparatus 500 according to an embodiment of the present invention.

Referring to FIG. 5, the frame processing apparatus 500 includes a receiving unit 510, a start location extraction unit 520, and a processing unit 530.

The receiving unit 510 receives a transport frame that includes at least one packet and start location information about a first packet. As described above, the first packet denotes a frame whose front and tail are both included within a transport frame and which is located first in the transport frame.

The start location extraction unit 520 extracts the start location of the first packet from the start location information included in the transport frame received by the receiving unit 510.

The start location extraction unit 520 may extract the start location of the first packet using various methods, according to the received start location information about the first packet.

In a first method, the start location information included in the received transport frame may be an offset value that denotes a distance between the start location of a packet transport channel of the transport frame and the first packet. The packet transport channel denotes a section that is included in a transport panel and used to transport packets.

In this case, the start location extraction unit 520 can obtain the start location of the first packet without performing an additional operation on the received start location information.

In a second method, the start location information included in the received transport frame may be a frame ID allocated to the received transport frame. In this case, the start location extraction unit 520 can find a start location of the first packet corresponding to the frame ID from a predetermined table that stores start locations of the first packets in the transport frames. The predetermined table may be stored in the frame processing apparatus 500 or received via the receiving unit 510.

Table 1 shows an example of the predetermined table in which start locations of the first packets corresponding to the frame IDs are stored.

TABLE 1

| Frame ID | Mode 1 | ... | Mode N |
|---|---|---|---|
| 1 | 0 | 0 | 0 |
| ... | ... | ... | ... |
| N | 340 | ... | 200 |

In Table 1, figures corresponding to the frame IDs are offset values that denote distances between start locations of packet transport channels and the first packets loaded in the packet transport channels.

The lengths of each packet and each transport frame are fixed, and thus Table 1 can be produced in advance. Table 1 may store values in various modes that depend on the format of each packet or each transport frame. Table 1 stores offset values for N different modes depending on the format of each packet or each transport frame.

In Table 1, first packets included in transport frames start at the same location on each transport frame at intervals of N frames. Accordingly, frame IDs are selected from among numbers 1 through N. Allocation of frame IDs in mode 1 will now be described.

The start locations of the first packets included in transport frames having frame IDs of 1 are '0'. In other words, the offset values of the transport frames are '0'. In the present embodiment, numbers 1 to N are allocated as frame IDs in the sequence where the transport frames are transported. Accordingly, transport frames having IDs of 1 may be a first transport frame, an (N+1)th transport frame, and a (2N+1)th transport frame. Similarly, transport frames having IDs of 2 may be a second transport frame, an (N+2)th transport frame, and a (2N+2)th transport frame.

In general, the start location of a packet transport channel on a transport frame initially transported is identical to the start location of the first packet loaded in the transport frame.

In other words, the start location of the first packet within the first frame has an offset value of 0. Thus, a transport frame with an ID of '1' has an offset value of 0.

A transport frame with an ID of 'N' has an offset value of 340. In other words, the start location of the transport frame with an ID of 'N' is a unit length of 340 away from the start location of a packet transport channel of the transport frame with an ID of 'N'.

In a third method, the start location information included in the received transport frame may include a frame ID allocated to the received transport frame, the length of each packet transport channel, and the length of each packet loaded in each transport frame. If the length of each packet transport channel or the length of each packet loaded in each transport frame may be stored in a predetermined space within the frame processing apparatus 500, the start location information included in the received transport frame may only include the frame ID.

The start location extraction unit 520 extracts the start location of the first packet according to a predetermined equation for calculating the start location of a first packet from the length of each packet transport channel and the length of each packet.

The predetermined equation may be Equation 1:

$$RAP(i) = \text{packet length} - MOD(\text{packet transport channel length} \times (i-1), \text{packet length}) \qquad (1)$$

where i denotes the ID of a transport frame, RAP(i) denotes the start location of a first packet loaded in a transport frame with an ID of 'i', and MOD( ) denotes a modulo function for calculating a remainder of a division of the packet transport channel length×(i−1) by the packet length. The start location extraction unit 520 extracts the start location of the first packet according to a predetermined equation that is based on the frame ID, the length of each packet transport channel, and the length of each packet.

The processing unit 530 processes the at least one packet included in the transport frame, according to the start location of the first packet extracted by the start location extraction unit 520.

The processing unit 530 may include a packet data extraction unit 532, a data parsing unit 534, and an output unit 536.

The packet data extraction unit 532 extracts the locations of packets according to the start location of the first packet extracted by the start location extraction unit 520. As described above, since the lengths of packets are consistent, a new packet starts at a location a packet length away from the start location of the first packet. In this way, the start locations of the packets other than the first packet can be extracted, and thus all of the packets loaded in the received transport frame can be extracted.

The data parsing unit 534 parses data from the extracted packets.

The output unit 536 outputs the data parsed by the data parsing unit 534.

Figure 6:
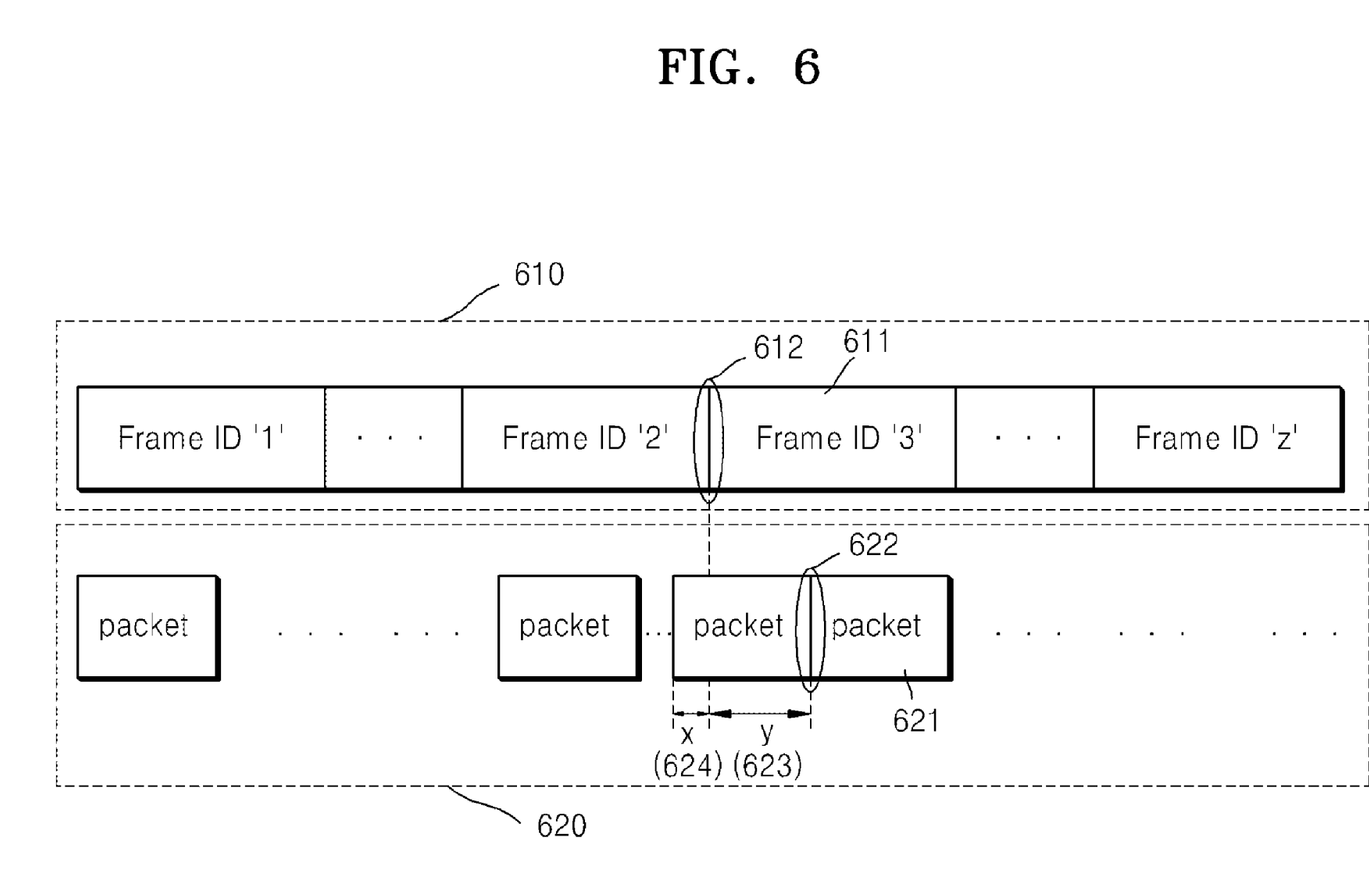
FIG. 6 shows a diagram for illustrating a method of identifying the start location of a packet according to a predetermined equation, according to an embodiment of the present invention.

FIG. 6 shows a diagram for illustrating a method of identifying the start location of a packet according to a predetermined equation, according to an embodiment of the present invention.

In the present embodiment, packets 620 are transported by being loaded in N transport frames 610. It is assumed that the length of each of the transport frames 610 is '20' and the length of each of the packets 620 is '3'. In this case, the cycle during which the start location of a first packet within each transport frame recurs is determined by a least common multiple of the length of each packet transport channel and the length of each packet. The least common multiple is 60.

Accordingly, the cycle is 3 transport frames. '1', '2', and '3' are sequentially allocated as frame IDs to the transport frames in the sequence where the transport frames are transported.

The frame ID of a ninth transport frame 611 is 3. A first packet 621 included in the ninth transport frame 611 is an initial packet whose head and tail are both included in the ninth transport frame 611 and which is included in the ninth transport frame 611. A start location 612 of a packet transport channel of the ninth transport frame 611 is not equal to a start location 622 of the first packet 612. Thus, the start location 622 of the first packet 621 needs to be calculated.

According to Equation 1, the offset value y(623) of the ninth transport frame 611 with an ID of '3' is 3−MOD(20*2, 3). MOD(20*2,3) is a remainder of a division of 20*2 by 3, and is represented by x(624). Thus, x(624) is 1, and y(623) is 2.

In this way, the start locations of first packets included in the other transport frames 610 can be identified.

Figure 7:
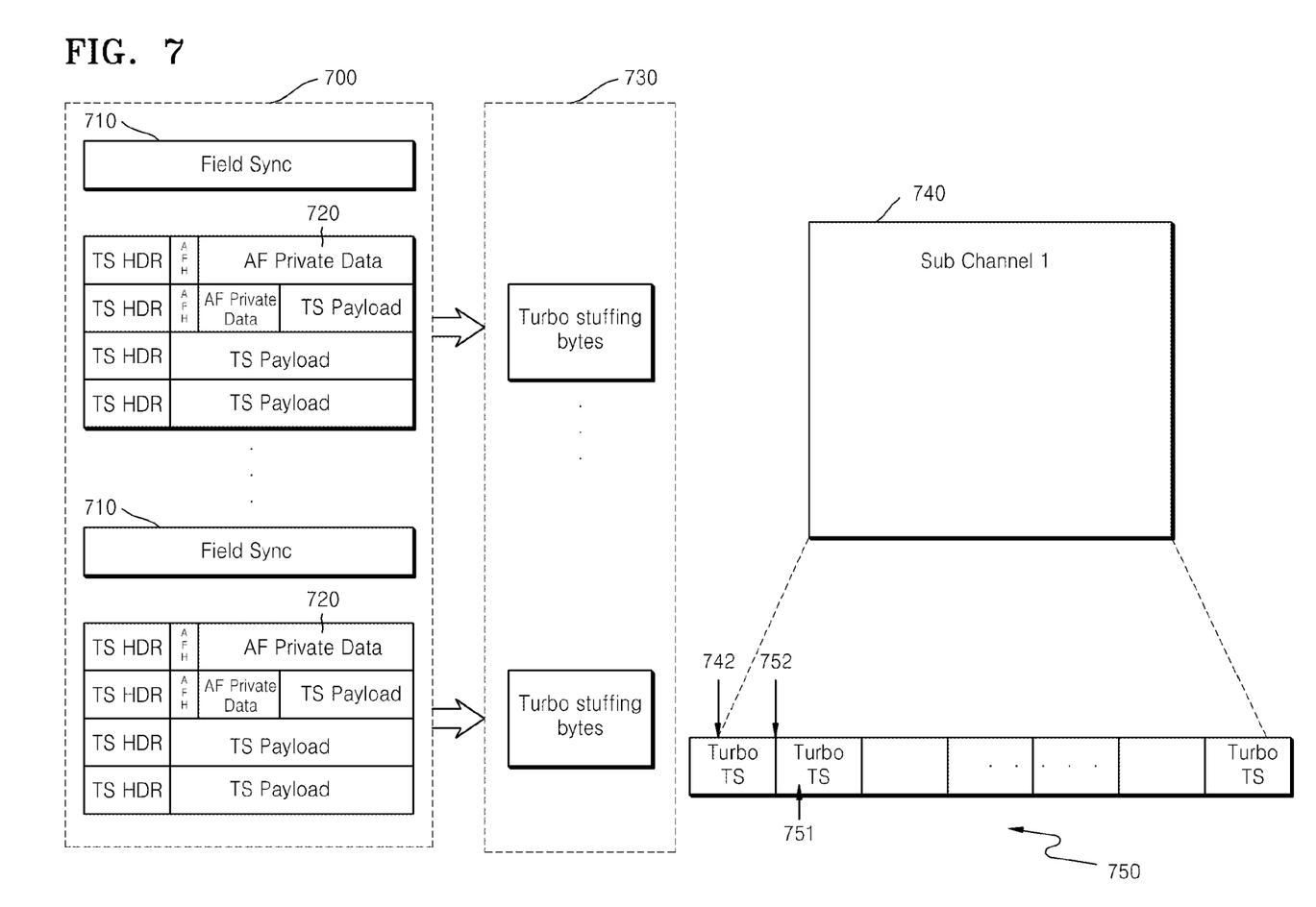
FIG. 7 illustrates an advanced vestigial side band (A-VSB) system to which a frame creating method according to an exemplary embodiment of the present invention is applied.

FIG. 7 illustrates an advanced vestigial side band (A-VSB) system to which a frame creating method according to an embodiment of the present invention is applied.

An image signal and an audio signal are compressed according to standards MPEG2 and AC-3, respectively, in an advanced television system committee (ATSC) stream 700, and transmitted using a VSB system.

The ATSC stream 700 has two field synchronization signals 710. The two field synchronization signals 710 or a single field synchronization signal include frame IDs according to an embodiment of the present invention for determining the start locations of a first packet.

The ATSC stream 700 includes an adaptation field 720, which has a space in which private data can be stored. The adaptation field 720 exists at intervals of 4 TS packets, and stores turbo stuffing data 730.

The turbo stuffing data 730 is transported by being loaded in a packet transport channel 740. As described above, it is not guaranteed that a start location 752 of a first packet 751 among packets 750 loaded in the packet transport channel 740 coincides with a start location 742 of the packet transport channel 740.

In order to synchronize the start location 752 of the first packet 751 with the start location 742 of the packet transport channel 740, the A-VSB system illustrated in FIG. 7 adds information about the start location 752 of the first packet 751 in a frame, instead of adding padding data to the tail of a packet as in the conventional art.

For example, a transport frame created according to an embodiment of the present invention may include a frame ID in the field synchronization signals 710, and the start location 752 of the first packet 751 may be determined using the frame ID. Accordingly, the transport frame can be transmitted without additional padding data.

Figure 8:
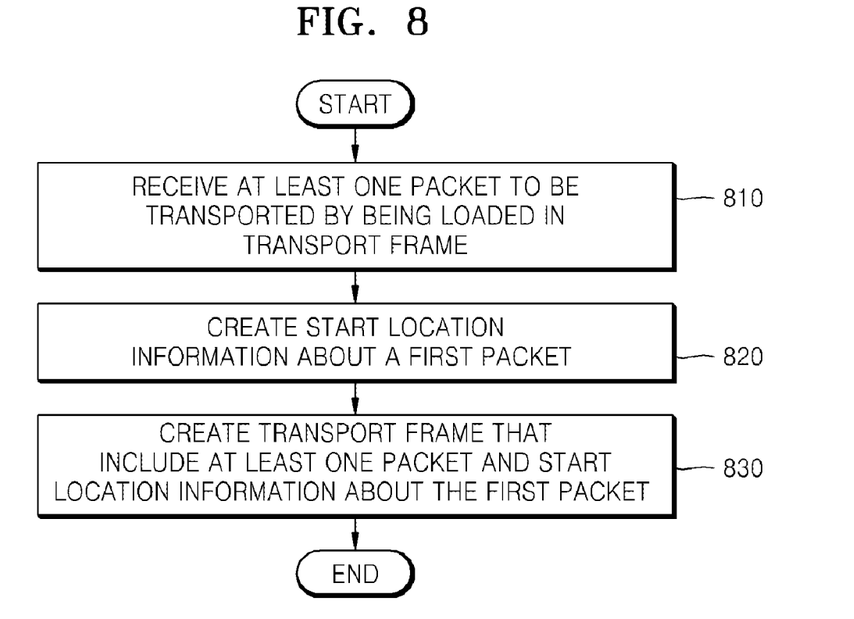
FIG. 8 is a flowchart of a frame creating method according to an exemplary embodiment of the present invention.

FIG. 8 is a flowchart of a frame creating method according to an embodiment of the present invention.

In operation 810, at least one packet to be transported by being loaded in a transport frame is received.

In operation 820, start location information about the first packet (that is, a packet whose head and tail are both in a transport frame and which comes first within the transport frame,) among the received at least one packet is created.

The start location information about the first packet may be implemented in various forms. First, the start location information about the first packet may be an offset value that denotes a distance from the start location of a packet transport channel of the transport frame, which is a section used to transport packets, to the first packet. Second, the start location information about the first packet may be a frame ID that is allocated to the transport frame and used to search for the start location of the first packet from a predetermined table that stores start locations for the first packet included in the transport frame. Third, the start location information about the first packet may include the frame ID allocated to the transport frame, the length of the packet transport channel, and the length of each packet, which are used in a predetermined equation for calculating the start location of the first packet according to the length of the packet transport channel and the length of each packet.

However, as described above, when a receiver can know the length of the packet transport channel and the length of each packet in the third case, the frame ID is sufficient as the start location information.

In operation 830, a transport frame is created, including the at least one packet received in operation 810 and the start location information about the first packet, created in operation 820.

Figure 9:
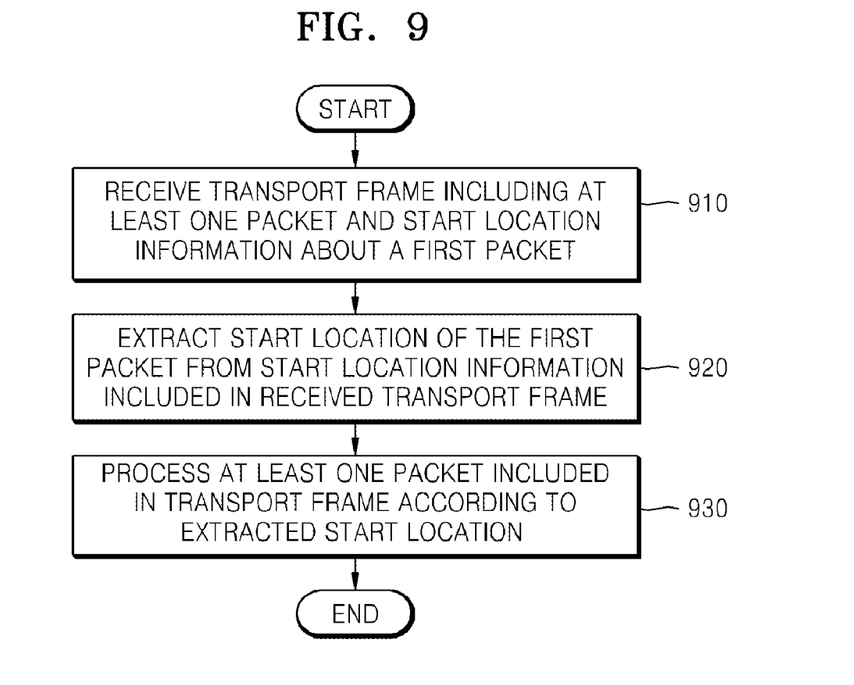
FIG. 9 is a flowchart of a frame processing method according to an exemplary embodiment of the present invention.

FIG. 9 is a flowchart of a frame processing method according to an embodiment of the present invention.

In operation 910, a transport frame including at least one packet and start location information about a first packet is received. The first packet denotes a packet whose head and tail are both in a transport frame and which comes first within the transport frame.

In operation 920, the start location of the first packet is extracted from the start location information included in the received transport frame.

In operation 930, the at least one packet included in the transport frame is processed according to the extracted start location.

The embodiments of the present invention can be written as computer programs and can be implemented in general-use digital computers that execute the programs using a computer readable recording medium.

Examples of the computer readable recording medium include magnetic storage media (e.g., ROM, floppy disks, hard disks, etc.), and optical recording media (e.g., CD-ROMs, or DVDs).

While various embodiments of the present invention have been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of creating a transport frame, the method comprising:
    receiving at least one packet to be transported by being loaded in the transport frame;
    creating start location information about a first packet, that is, a packet whose head and tail are both in the transport frame and which the first packet comes first among the received at least one packet within the transport frame; and
    creating, by an apparatus for creating the transport frame, the transport frame including the at least one packet and the start location information about the first packet,
    wherein the creating comprises, when a portion of another packet is located in another transport frame and another portion of the another packet is located in the transport frame prior to the head of the first packet, creating the start location information of the first packet, and
    wherein the start location information comprises at least one of:
        an offset value that denotes a distance from a start location of a packet transport channel, which is a section included in the transport frame and used to transport packets, to the first packet, and
        a frame ID that is allocated to the transport frame and used to search for the start location of the first packet from a predetermined table that stores start locations for the first packet included in the transport frame.

2. The method of claim 1, wherein the start location information about the first packet is the offset value that denotes the distance from the start location of the packet transport channel, which is the section included in the transport frame and used to transport the packets, to the first packet.

3. The method of claim 1, wherein the start location information about the first packet is the frame ID that is allocated to the transport frame and used to search for the start location of the first packet from the predetermined table that stores the start locations for the first packet included in the transport frame.

4. The method of claim 1, wherein the start location information about the first packet comprises the frame ID allocated to the transport frame, a length of the packet transport channel, and a length of each packet, which are used in a predetermined equation for calculating the start location of the first packet according to the length of the packet transport channel and the length of each packet.

5. A non-transitory computer readable recording medium having recorded thereon a computer program for executing the method of claim 1.

6. A method of creating a transport frame, the method comprising:
    receiving at least one packet to be transported by being loaded in the transport frame;
    creating start location information about a first packet, that is, a packet whose head and tail are both in the transport frame and which the first packet comes first among the received at least one packet within the transport frame; and
    creating, by an apparatus for creating the transport frame, the transport frame including the at least one packet and the start location information about the first packet,
    wherein the start location information about the first packet comprises a frame ID allocated to the transport frame, a length of the packet transport channel, and a length of each packet, which are used in a predetermined equation for calculating the start location of the first packet according to the length of the packet transport channel and the length of each packet, and
    wherein the creating of the start location information about the first packet further comprises:
    calculating a cyclical group of frame IDs which each correspond to a recurring start location of the first packet, by using a least common multiple of the length of the packet transport channel of the transport frame and the length of each packet; and
    sequentially allocating one of the frame IDs to the transport frame, the frame IDs being repeated at intervals of the calculated cycle.

7. A method of creating a transport frame, the method comprising:
    receiving at least one packet to be transported by being loaded in the transport frame;
    creating start location information about a first packet, that is, a packet whose head and tail are both in the transport frame and which the first packet comes first among the received at least one packet within the transport frame; and creating, by an apparatus for creating the transport frame, the transport frame including the at least one packet and the start location information about the first packet, wherein the start location information about the first packet comprises a frame ID allocated to the transport frame, a length of the packet transport channel, and a length of each packet, which are used in a predetermined equation for calculating the start location of the first packet according to the length of the packet transport channel and the length of each packet, and wherein the predetermined equation is:

$$RAP(i)=\text{packet length}-\text{MOD}(\text{packet transport channel length}\times(i-1), \text{packet length})$$

where i denotes the frame ID of the transport frame, RAP(i) denotes the start location of the first packet loaded in a transport frame with an ID of 'i', and MOD( ) denotes a modulo function for calculating a remainder of a division of the packet transport channel length×(i−1) by the packet length.

8. A method of processing a transport frame, the method comprising:

receiving a transport frame, the transport frame including at least one packet and start location information about a first packet, which is a packet whose head and tail are both in the transport frame and which the first packet comes first within the transport frame;

extracting a start location of the first packet from the start location information included in the received transport frame; and processing, by an apparatus for processing the transport frame, the at least one packet included in the transport frame, based on the extracted start location, wherein, when a portion of another packet is located in another transport frame and another portion of the another packet is located in the received transport frame prior to the head of the first packet, the extracted start location information is of the first packet, and wherein the start location information about the first packet comprises at least one of:

an offset value that denotes a distance from a start location of a packet transport channel, which is a section included in the transport frame and used to transport packets, to the first packet, and a frame ID allocated to the received transport frame and used to search for the start location of the first packet from a predetermined table that stores start locations for the first packet included in the transport frame.

9. The method of claim 8, wherein the start location information about the first packet is the offset value that denotes the distance from the start location of the packet transport channel, which is the section included in the transport frame and used to transport the packets, to the first packet.

10. The method of claim 8, wherein:

the start location information about the first packet is the frame ID allocated to the received transport frame; and the extracting of the start location of the first packet comprises searching the start location of the first packet corresponding to the frame ID from the predetermined table that stores the start locations for the first packet included in the transport frame.

11. The method of claim 8, wherein:

the start location information about the first packet comprises the frame ID allocated to the received transport frame, a length of a packet transport channel, which is a section included in the received transport frame and used to transport packets, and a length of each packet included in the received transport frame; and the extracting of the start location of the first packet comprises computing the start location of the first packet according to a predetermined equation for calculating the start location of the first packet according to the length of the packet transport channel and the length of each packet.

12. A non-transitory computer readable recording medium having recorded thereon a computer program for executing the method of claim 8.

13. A method of processing a transport frame, the method comprising:

receiving a transport frame, the transport frame including at least one packet and start location information about a first packet, which is a packet whose head and tail are both in the transport frame and which the first packet comes first within the transport frame;

extracting a start location of the first packet from the start location information included in the received transport frame; and processing, by an apparatus for processing the transport frame, the at least one packet included in the transport frame, based on the extracted start location, wherein the start location information about the first packet comprises a frame ID allocated to the received transport frame, a length of a packet transport channel, which is a section included in the received transport frame and used to transport packets, and a length of each packet included in the received transport frame, wherein the extracting of the start location of the first packet comprises computing the start location of the first packet according to a predetermined equation for calculating the start location of the first packet according to the length of the packet transport channel and the length of each packet, and wherein the predetermined equation is:

$$RAP(i)=\text{packet length}-\text{MOD}(\text{packet transport channel length}\times(i-1), \text{packet length})$$

where i denotes the frame ID of the transport frame, RAP(i) denotes the start location of the first packet loaded in a transport frame with an ID of 'i', and MOD( ) denotes a modulo function for calculating a remainder of a division of the packet transport channel length×(i−1) by the packet length.

14. An apparatus for creating a transport frame, the apparatus comprising:

a receiving unit which receives at least one packet to be transported by being loaded in the transport frame;

a start location information creating unit which creates start location information about a first packet, that is, a packet whose head and tail are both in the transport frame and which the first packet comes first among the received at least one packet within the transport frame; and a frame multiplexing unit which creates the transport frame, the transport frame including the at least one packet and the start location information about the first packet, wherein, when a portion of another packet is located in another transport frame and another portion of the another packet is located in the transport frame prior to the head of the first packet, the start location information creating unit creates the start location information of the first packet, and wherein the start location information comprises at least one of:

an offset value that denotes a distance from a start location of a packet transport channel, which is a section included in the transport frame and used to transport packets, to the first packet, and a frame ID that is allocated to the transport frame and used to search for the start location of the first packet from a predetermined table that stores start locations for the first packet included in the transport frame.

15. The apparatus of claim 14, wherein the start location information about the first packet is the offset value that denotes the distance from the start location of the packet transport channel, which is the section included in the transport frame and used to transport the packets, to the first packet.

16. The apparatus of claim 14, wherein the start location information about the first packet is the frame ID that is allocated to the transport frame and used to search for the start location of the first packet from the predetermined table that stores the start locations for the first packet included in the transport frame.

17. The apparatus of claim 14, wherein the start location information about the first packet comprises the frame ID allocated to the transport frame, a length of the packet transport channel, and a length of each packet, which are used in a predetermined equation for calculating the start location of the first packet according to the length of the packet transport channel and the length of each packet.

18. An apparatus for creating a transport frame, the apparatus comprising:
a receiving unit which receives at least one packet to be transported by being loaded in the transport frame;
a start location information creating unit which creates start location information about a first packet, that is, a packet whose head and tail are both in the transport frame and which the first packet comes first among the received at least one packet within the transport frame; and
a frame multiplexing unit which creates the transport frame, the transport frame including the at least one packet and the start location information about the first packet,
wherein the start location information about the first packet comprises a frame ID allocated to the transport frame, a length of the packet transport channel, and a length of each packet, which are used in a predetermined equation for calculating the start location of the first packet according to the length of the packet transport channel and the length of each packet, and
wherein the start location information creating unit comprises:
a cycle calculation unit which calculates a cyclical group of frame IDs which each correspond to a recurring start location of the first packet within each transport frame, by using a least common multiple of the length of the packet transport channel of the transport frame and the length of each packet; and
a frame ID creation unit which sequentially allocates one of frame IDs to the transport frame, the frame IDs repeated at intervals of the calculated cycle.

19. An apparatus for creating a transport frame, the apparatus comprising:
a receiving unit which receives at least one packet to be transported by being loaded in the transport frame;
a start location information creating unit which creates start location information about a first packet, that is, a packet whose head and tail are both in the transport frame and which the first packet comes first among the received at least one packet within the transport frame; and a frame multiplexing unit which creates the transport frame, the transport frame including the at least one packet and the start location information about the first packet,
wherein the start location information about the first packet comprises a frame ID allocated to the transport frame, a length of the packet transport channel, and a length of each packet, which are used in a predetermined equation for calculating the start location of the first packet according to the length of the packet transport channel and the length of each packet, and
wherein the predetermined equation is:

$$RAP(i) = \text{packet length} - \text{MOD}(\text{packet transport channel length} \times (i-1), \text{packet length})$$

where i denotes the frame ID of the transport frame, RAP(i) denotes the start location of the first packet loaded in a transport frame with an ID of 'i', and MOD( ) denotes a modulo function for calculating a remainder of a division of the packet transport channel length×(i−1) by the packet length.

20. An apparatus for processing a transport frame, the apparatus comprising:
a receiving unit which receives the transport frame, the transport frame including at least one packet and start location information about a first packet, which is a packet whose head and tail are both in the transport frame and which the first packet comes first within the transport frame;
a start location extraction unit which extracts a start location of the first packet from the start location information included in the received transport frame; and
a processing unit which processes the at least one packet included in the transport frame, based on the extracted start location,
wherein, when a portion of another packet is located in another transport frame and another portion of the another packet is located in the received transport frame prior to the head of the first packet, the extracted start location information is of the first packet, and
wherein the start location information about the first packet comprises at least one of:
an offset value that denotes a distance from a start location of a packet transport channel, which is a section included in the transport frame and used to transport packets, to the first packet, and
a frame ID allocated to the received transport frame and used to search for the start location of the first packet from a predetermined table that stores start locations for the first packet included in the transport frame.

21. The apparatus of claim 20, wherein the start location information about the first packet is the offset value that denotes the distance from the start location of the packet transport channel, which is the section included in the transport frame and used to transport the packets, to the first packet.

22. The apparatus of claim 20, wherein:
the start location information about the first packet is the frame ID allocated to the received transport frame; and
the start location extraction unit extracts the start location of the first packet corresponding to the frame ID from the predetermined table that stores the start locations for the first packet included in the transport frame.

23. The apparatus of claim 20, wherein:
the start location information about the first packet comprises the frame ID allocated to the received transport frame, a length of a packet transport channel, which is a section included in the received transport frame and used to transport packets, and a length of each packet included in the received transport frame; and the start location extraction unit computes the start location of the first packet according to a predetermined equation for calculating the start location of the first packet according to the length of the packet transport channel and the length of each packet.

24. An apparatus for processing a transport frame, the apparatus comprising:

a receiving unit which receives the transport frame, the transport frame including at least one packet and start location information about a first packet, which is a packet whose head and tail are both in the transport frame and which the first packet comes first within the transport frame;

a start location extraction unit which extracts a start location of the first packet from the start location information included in the received transport frame; and a processing unit which processes the at least one packet included in the transport frame, based on the extracted start location, wherein the start location information about the first packet comprises a frame ID allocated to the received transport frame, a length of a packet transport channel, which is a section included in the received transport frame and used to transport packets, and a length of each packet included in the received transport frame, wherein the start location extraction unit computes the start location of the first packet according to a predetermined equation for calculating the start location of the first packet according to the length of the packet transport channel and the length of each packet, and wherein the predetermined equation is:

$$RAP(i) = \text{packet length} - \text{MOD}(\text{packet transport channel length} \times (i-1), \text{packet length})$$

where i denotes the frame ID of the transport frame, RAP(i) denotes the start location of the first packet loaded in a transport frame with an ID of 'i', and MOD( ) denotes a modulo function for calculating a remainder of a division of the packet transport channel length×(i−1) by the packet length.

* * * * *